(12) United States Patent
Chen et al.

(10) Patent No.: US 7,336,039 B2
(45) Date of Patent: Feb. 26, 2008

(54) DRIVING DEVICE FOR DISCHARGE LAMPS

(75) Inventors: Chia-Kun Chen, Tu-Cheng (TW); Chia-Peng Wang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 69 days.

(21) Appl. No.: 11/323,246

(22) Filed: Dec. 30, 2005

(65) Prior Publication Data

US 2007/0041230 A1 Feb. 22, 2007

(30) Foreign Application Priority Data

Aug. 19, 2005 (TW) .............................. 94128514 A

(51) Int. Cl.
*H05B 37/02* (2006.01)
*H05B 41/16* (2006.01)

(52) U.S. Cl. ...................... 315/213; 315/226; 315/255; 315/277; 315/299

(58) Field of Classification Search ............ 315/209 R, 315/210, 211, 212, 213, 219, 220, 224, 225, 315/226, 246, 250, 254, 255, 276, 277, 291, 315/299

See application file for complete search history.

(56) References Cited

U.S. PATENT DOCUMENTS

| | | | |
|---|---|---|---|
| 3,896,336 A * | 7/1975 | Schreiner et al. ........... 315/226 |
| 4,060,751 A * | 11/1977 | Anderson ................ 315/209 R |
| 4,139,805 A * | 2/1979 | Cosco et al. ............ 315/241 R |
| 4,415,247 A * | 11/1983 | Takematsu .................. 396/172 |
| 5,319,281 A * | 6/1994 | Roth ........................... 315/94 |
| 5,886,475 A * | 3/1999 | Horiuchi et al. ......... 315/169.3 |
| 6,172,467 B1 | 1/2001 | Vollkommer et al. ....... 315/246 |
| 6,707,264 B2 * | 3/2004 | Lin et al. ..................... 315/307 |
| 6,864,643 B2 * | 3/2005 | Min et al. .................... 315/246 |

* cited by examiner

*Primary Examiner*—Thuy Vinh Tran
(74) *Attorney, Agent, or Firm*—Morris Manning Martin LLP; Tim Tingkang Xia, Esq.

(57) ABSTRACT

A driving device for driving discharge lamps (14) includes a first pulse circuit (11), a second pulse circuit (13), and a primary driving circuit (12). The first pulse circuit includes an input end, a first output end (1), and a second output end (2). The second pulse circuit includes an input end, a third output end (3), and a fourth output end (4). The primary driving circuit is connected between the first pulse circuit and the second pulse circuit for generating drive signals. The second output end of the first pulse circuit is connected to the third output end of the second pulse circuit, and the fourth output end of the second pulse circuit is connected to ground.

20 Claims, 4 Drawing Sheets

DRIVING DEVICE FOR DISCHARGE LAMPS

BACKGROUND

1. Field of the Invention

The invention relates to electronic driving devices, and particularly to a driving device for driving discharge lamps such as those of a flat panel display device.

2. Related Art

Conventionally, cold cathode fluorescent lamps (CCFLs) have been commonly used as a light source of a liquid crystal display (LCD) panel. When an LCD panel is large, the CCFLs need to be correspondingly long. However, elongated CCFLs frequently produce non-uniform distribution of brightness and temperature, electronic noise, or other problems. Therefore, CCFLs are gradually being replaced by other light sources such as planar light sources.

Like the CCFL, a typical planar light source is a kind of discharge lamp. However, the planar light source has a simple structure, uniform brightness, good temperature stability, and a long working lifetime. Consequently, CCFLs are frequently being replaced by planar light sources as the light source of choice for large LCD panels.

The method of driving a planar light source is different from that of the CCFL, since the planar light source and the CCFL have different structures and characteristics. Typically, the CCFL is driven by a sine waveform voltage. However, a planar light source is driven by a high pulse-voltage sequence. That is, a high pulse-voltage is applied to xenon gas contained in the planar light source, ultraviolet (UV) radiation is generated by the xenon gas, and the UV radiation is converted to visible light by reacting with fluorescent materials.

What is needed is to provide a driving device for driving discharge lamps such as those of a flat panel display device.

SUMMARY

An exemplary embodiment of the present invention provides a driving device for driving a plurality of lamps. The driving device includes a first pulse circuit, a second pulse circuit, and a primary driving circuit. The first pulse circuit includes an input end, a first output end, and a second output end. The second pulse circuit includes an input end, a third output end, and a fourth output end. The primary driving circuit is connected between the first pulse circuit and the second pulse circuit for generating drive signals. The second output end of the first pulse circuit is connected to the third output end of the second pulse circuit, and the fourth output end of the second pulse circuit is connected to ground.

Another exemplary embodiment of the present invention provides a larger driving device for driving a plurality of lamps. The driving device includes a plurality of pulse circuits and a primary driving circuit. Each of the pulse circuits includes an input end, a first output end, and a second output end. The number of pulse circuits is defined as n, where n is an integer from 1 to (k+1). The primary driving circuit includes an input end connected to the first pulse circuit for generating drive signals. The second output end of the $k^{th}$ pulse circuit is connected to the first output end of the $(k+1)^{th}$ pulse circuit, and the second output end of the $(k+1)^{th}$ pulse circuit is connected to ground.

Other advantages and novel features will become more apparent from the following detailed description when taken in conjunction with the accompanying drawings, in which:

DETAILED DESCRIPTION OF THE EMBODIMENTS

Figure 1:
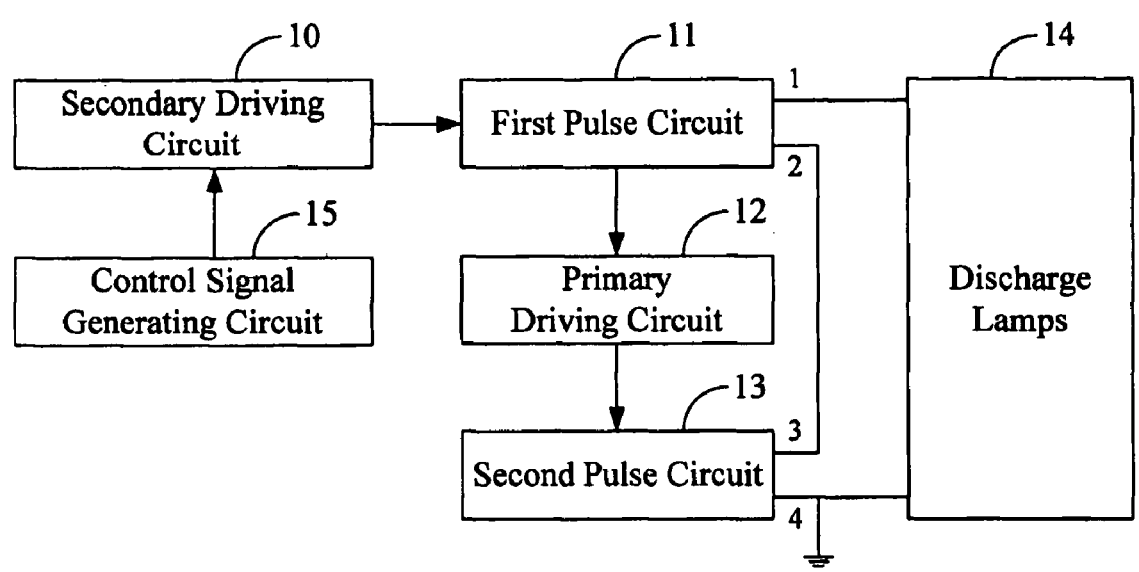
FIG. 1 is a block diagram of a driving device for driving a plurality of lamps, according to an exemplary embodiment of the present invention.

FIG. 1 is a schematic diagram of a driving device of an exemplary embodiment of the invention. The driving device comprises a primary driving circuit 12, a secondary driving circuit 10, a first pulse circuit 11, a second pulse circuit 13, illuminators of a display device to be driven by the driving device like discharge lamps 14, and a control signal generating circuit 15. The first pulse circuit 11 comprises an input end, a first output end 1, and a second output end 2. The second pulse circuit 13 comprises an input end, a third output end 3, and a fourth output end 4. The primary driving circuit 12 is connected between the first pulse circuit 11 and the second pulse circuit 13.

The control signal generating circuit 15 generates control signals, which are then transmitted to the secondary driving circuit 10. The secondary driving circuit 10 generates drive signals according to the control signals, and drives the first pulse circuit 11 to generate a first pulse sequence. The first pulse sequence is outputted from the first output end 1 and the second output end 2 of the first pulse circuit 11. In the exemplary embodiment, the first pulse sequence is a positive pulse sequence. The primary driving circuit 12 generates drive signals according to the first pulse sequence, and drives the second pulse circuit 13 to generate a second pulse sequence. The second pulse sequence is outputted from the third output end 3 and the fourth output end 4 of the second pulse circuit 13. In the exemplary embodiment, the second output end 2 of the first pulse circuit 11 is connected to the third output end 3 of the second pulse circuit 13, and the fourth output end 4 of the second pulse circuit 13 is connected to ground. Therefore, the second pulse sequence is also a positive pulse sequence. The first output end 1 of the first pulse circuit 11 and the fourth output end 4 of the second pulse circuit 13 are respectively connected to the discharge lamps 14, and a pulse-voltage sequence for driving the discharge lamps 14 is equal to the sum of the first pulse sequence and the second pulse sequence.

In the exemplary embodiment, a time delay between the second pulse sequence generated by the second pulse circuit 13 and the first pulse sequence generated by the first pulse circuit 11 is very short, and thus can be ignored. In that case, the first pulse sequence and the second pulse sequence can be regarded as in-phase.

Figure 2:
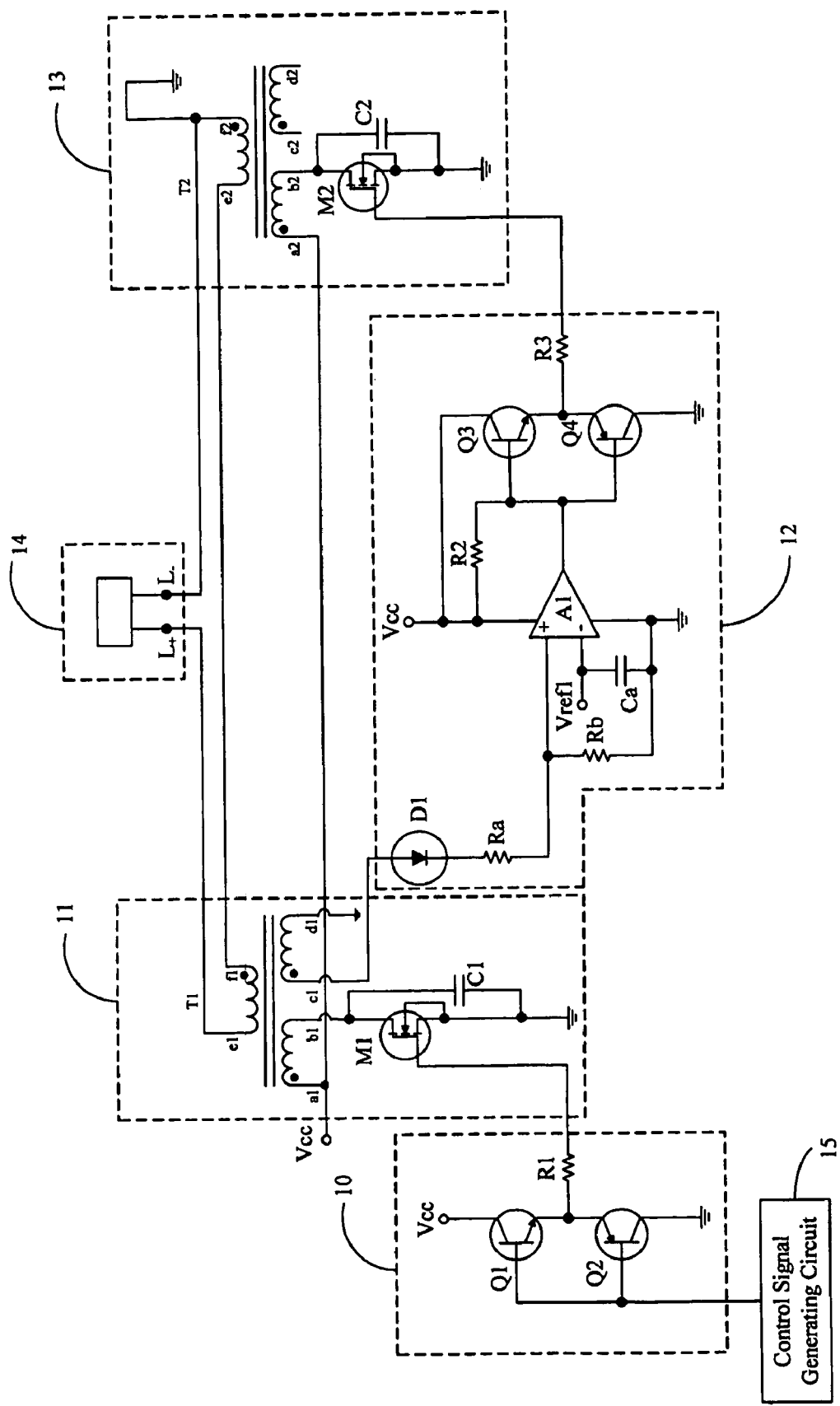
FIG. 2 is a circuit diagram illustrating more details of the driving device shown in FIG. 1.

FIG. 2 is a circuit diagram illustrating more detail of the driving device. The secondary driving circuit 10 comprises an NPN-transistor Q1, a PNP-transistor Q2, a voltage source Vcc, and a resistor R1. The NPN-transistor Q1 and the PNP-transistor Q2 respectively have a base, a drain, and an emitter. The bases of the NPN-transistor Q1 and the PNP-transistor Q2 are jointly connected to the control signal generating circuit 15, and the joint can be considered as an input end of the secondary driving circuit 10. The drain of the NPN-transistor Q1 is connected to the voltage source Vcc. The emitters of the NPN-transistor Q1 and the PNP-transistor Q2 are jointly connected to a first end of the resistor R1, and the drain of the PNP-transistor Q2 is grounded.

The first pulse circuit 11 comprises a switch element M1, a transformer T1, and a capacitor C1. In the exemplary embodiment, the switch element M1 is a metal oxide semiconductor field effect transistor (MOSFET), comprising an input end, a fifth output end, and a sixth output end. The transformer T1 comprises a first primary winding, a second primary winding, and a secondary winding. The first primary winding comprises a first input end a1 and a second input end b1, the second primary winding comprises a third input end c1 and a fourth input end d1, and the secondary winding comprises a fifth input end e1 and a sixth input end f1. In the exemplary embodiment, the input end of the MOSFET M1 is a gate connected to a second end of the resistor R1. The fifth output end of the MOSFET M1 is a source that is grounded, and the sixth output end of the MOSFET M1 is a drain connected to the second input end b1 end of the first primary winding of the transformer T1. One end of the capacitor C1 is connected to the source of the MOSFET M1, and another end of the capacitor C1 is connected to the drain of the MOSFET M1. The first input end a1 of the first primary winding of the transformer T1 is connected to the voltage source Vcc, and the fourth input end d1 of the second primary winding of the transformer T1 is grounded.

The primary driving circuit 12 comprises a diode D1, a comparator A1, an NPN-transistor Q3, a PNP-transistor Q4, a capacitor Ca, and a plurality of resistors Ra, Rb, R2 and R3. The diode D1 comprises an anode and a cathode. The anode of the diode D1 is connected to the third input end c1 of the second primary winding of the transformer T1, and the cathode of the diode D1 is connected to one end of the resistor Ra. The comparator A1 comprises a first pin, a second pin, a third pin, a fourth pin, and a fifth pin. The first pin of the comparator A1 is connected to another end of the resistor Ra, the second pin of the comparator A1 is connected to a reference voltage Vref1, the third pin of the comparator A1 is connected to a voltage source Vcc, the fourth pin of the comparator A1 is grounded, and the fifth pin of the comparator A1 is connected to the input end of the second pulse circuit 13. The resistor Rb is connected between the first pin of the comparator A1 and ground. The resistors Ra and Rb form a voltage dividing circuit for steadying input voltage to the comparator A1.

In the exemplary embodiment, the resistance value of the resistor Rb is greater than that of the resistor Ra. The capacitor Ca is connected between the second pin of the comparator A1 and ground. The NPN-transistor Q3, the PNP-transistor Q4 and the resistor R3 have similar connections to those of the NPN-transistor Q1, the PNP-transistor Q2 and the resistor R1 of the secondary driving circuit 10, a difference being that bases of the NPN-transistor Q3 and the PNP-transistor Q4 are jointly connected to the fifth pin of the comparator A1. The resistor R2 is connected between the voltage source Vcc and the fifth pin of the comparator A1. An end of the resistor R3 is an output end of the primary driving circuit 12.

The second pulse circuit 13 comprises a switch element M2, a transformer T2 and a capacitor C2, having similar connections to those of the switch element M1, the transformer T1 and the capacitor C1 of the first pulse circuit 11. A difference is that a third input end c2 and a fourth input end d2 of a second primary winding of the transformer T2 are suspended, and a sixth input end f2 of a secondary winding of the transformer T2 is grounded. In the exemplary embodiment, the switch element M2 is a MOSFET.

In the exemplary embodiment, the sixth input end f1 of the secondary winding of the transformer T1 is connected to the fifth input end e2 of the secondary winding of the transformer T2. The fifth input end e1 of the secondary winding of the transformer T1 and the sixth input end f2 of the secondary winding of the transformer T2 are respectively connected the discharge lamps 14.

In the exemplary embodiment, the control signals generated by the control signals generating circuit 15 are in the form of a sequence of square waves. During a positive cycle of the square-wave sequence, the NPN-transistor Q1 is on, and the PNP-transistor Q2 is off, which means that the MOSFET M1 is on. The first primary winding of the transformer T1 stores energy in a core thereof. In a negative cycle of the square-wave sequence, the NPN-transistor Q1 is off, and the PNP-transistor Q2 is on, which means that the MOSFET M1 is off. The first primary winding of the transformer T1 releases the stored energy. Therefore, a first pulse sequence is generated from the fifth input end e1 and the sixth input end f1 of the secondary winding of the transformer T1. According to the first pulse sequence, another pulse sequence is induced from the third input end c1 and the fourth input end d1 of the second primary winding of the transformer T1. In the exemplary embodiment, the first pulse sequence is converted to a variable direct current (DC) signal via the diode D1. The variable DC voltage is divided by the resistors Ra and Rb, and then a voltage of the resistor Rb is compared with the reference voltage Vref1 in the comparator A1. In the exemplary embodiment, the capacitor C1 is used for filtering noises.

When the voltage of the resistor Rb is higher than the reference voltage Vref1, the fifth pin of the comparator A1 outputs a high potential. When the voltage of the resistor Rb is lower than the reference voltage Vref1, the fifth pin of the comparator A1 outputs a low potential. Therefore, the variable DC voltage is converted to another square-wave sequence through the comparator A1. Similarly, during the positive cycle of the square-wave sequence outputted from the comparator A1, the NPN-transistor Q3 is on, and the PNP-transistor Q4 is off, which means that the MOSFET M2 is on. The transformer T2 stores energy in a core thereof. During the negative cycle of the square-wave sequence outputted from the comparator A1, the NPN-transistor Q3 is off, and the PNP-transistor Q4 is on, which means that the MOSFET M2 is off. The first primary winding of the transformer T2 releases the stored energy. Consequently, the second pulse sequence is generated from the fifth input end e2 and the sixth input end f2 of the secondary winding of the transformer T2.

Because the sixth input end f1 of the secondary winding of the transformer T1 is connected to the fifth input end e2 of the secondary winding of the transformer T2, and the fifth input end e1 of the secondary winding of the transformer T1 and the sixth input end f2 of the secondary winding of the transformer T2 are respectively connected to the discharge lamps 14, the pulse-voltage sequence for driving the discharge lamps 14 is equal to the sum of the first pulse sequence and the second pulse sequence.

The invention provides another embodiment when the pulse-voltage sequence for driving the discharge lamps 14 is higher.

Figure 3:
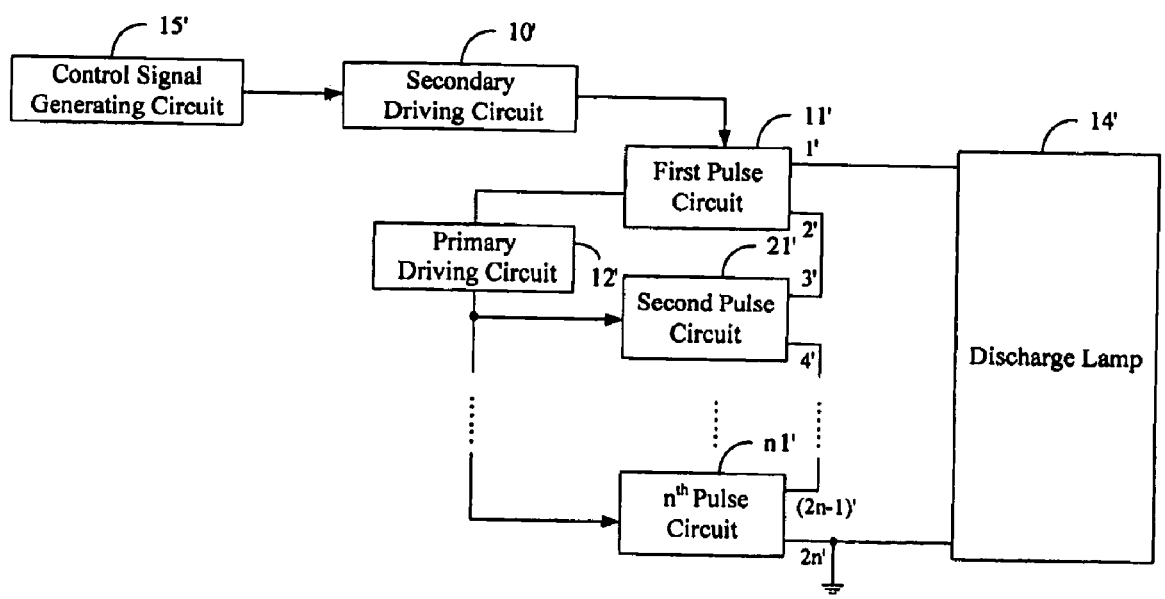
FIG. 3 is a block diagram of a driving device for driving a plurality of lamps, according to another exemplary embodiment of the present invention.

FIG. 3 is a schematic diagram of a driving device of an another exemplary embodiment of the invention. The driving device comprises a primary driving circuit 12', a secondary driving circuit 10', a plurality of pulse circuits n1' (n=1, 2, 3, . . . , n), discharge lamps 14', and a control signal generating circuit 15'. It is to be noted that the number of pulse circuits n1' can be predetermined according to the level of the pulse-voltage sequence required and the number of discharge lamps. That is, the number of pulse circuits n1' is not limited to any particular number. The first pulse circuit 11' comprises a first output end 1' and a second output end 2', the second pulse circuit 21' comprises a third output end 3' and a fourth output end 4', and so on through to the $n^{th}$ pulse circuit n1' comprises a $(2n-1)^{th}$ output end (2n-1)' and a $2n^{th}$ output end 2n' (n=1, 2, 3, . . . , n).

The control signal generating circuit 15' generates control signals that are then transmitted to the secondary driving circuit 10'. The secondary driving circuit 10' generates driving signals according to the control signals, and drives the first pulse circuit 11' to generate a first pulse sequence based on the driving signals. The first pulse sequence is outputted from the first output end 1' and the second output end 2' of the first pulse circuit 11'. In the exemplary embodiment, the first pulse sequence is a positive pulse sequence. The primary driving circuit 12' is connected to the first pulse circuit 11', and generates driving signals according to the first pulse sequence to drive the second pulse circuit 21', the third pulse circuit 31', and so on through to the $n^{th}$ pulse circuit n1' simultaneously. Therefore, a second pulse sequence, a third pulse sequence, and so on through to an $n^{th}$ pulse sequence are generated by the second pulse circuit 21', the third pulse circuit 31', and so on through to the $n^{th}$ pulse circuit n1' respectively, all of which are positive pulse sequences.

In the exemplary embodiment, the second output end 2' of the first pulse circuit 11' is connected to the third output end 3' of the second pulse circuit 21', the fourth output end 4' of the second pulse circuit 21' is connected to the fifth output end 5' (not shown) of the third pulse circuit 31' (not shown), and so on through to the $(2n-2)^{th}$ output end (2n-2)' (not shown) of the $(n-1)^{th}$ pulse circuit (n-1)1' (not shown) is connected to the $(2n-1)^{th}$ output end (2n-1)' of the $n^{th}$ pulse circuit n1'. The first output end 1' of the first pulse circuit 11' and the $2n^{th}$ output end 2n' of the $n^{th}$ pulse circuit n1' are respectively connected to the discharge lamps 14', and the $2n^{th}$ output end 2n' of the $n^{th}$ pulse circuit n1' is grounded. Therefore, a pulse-voltage sequence for driving the discharge lamps 14' is equal to the sum of the first pulse sequence, the second pulse sequence, and so on through to the $n^{th}$ pulse sequence.

Figure 4:
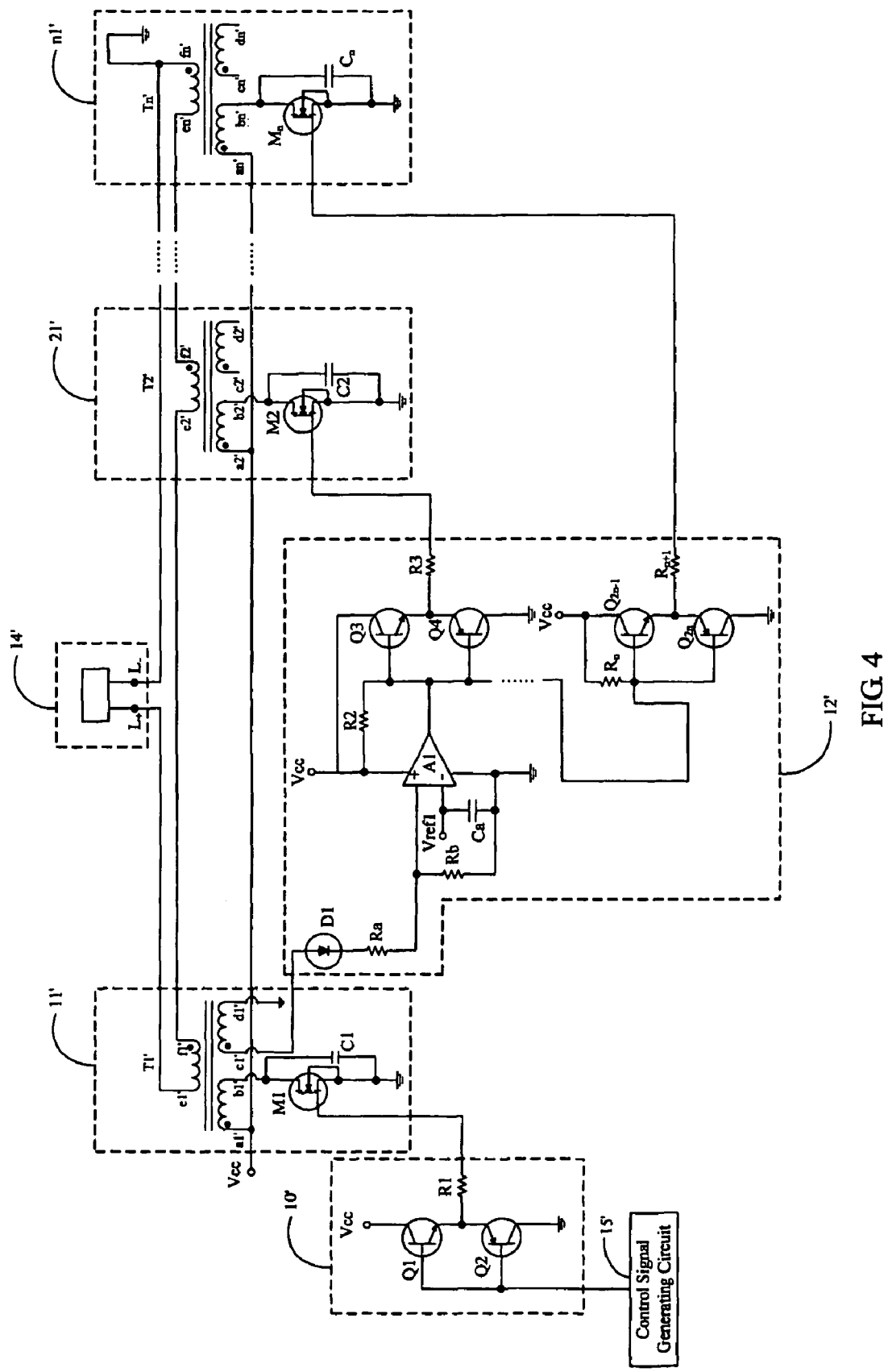
FIG. 4 is a circuit diagram illustrating more details of the driving device shown in FIG. 3.

FIG. 4 is a circuit diagram illustrating more detail of the driving device. The secondary driving circuit 10' comprises an NPN-transistor Q1, a PNP-transistor Q2 and a resistor R1, and has similar connections to those of the NPN-transistor Q1, the PNP-transistor Q2 and the resistor R1 of the secondary driving circuit 10.

In the exemplary embodiment, each pulse circuit n1' (n=1, 2, 3, . . . , n) comprises a switch element Mn, a capacitor Cn, and a transformer Tn' (n=1, 2, 3, . . . , n), and has similar connections to those of the switch element M1, the capacitor C1 and the transformer T1 of the first pulse circuit 11. It is to be noted that the number n is not limited to any particular number, but rather can be predetermined according to the number of pulse circuits. In the exemplary embodiment, the switch element Mn is a MOSFET. The transformers Tn' (n=1, 2, 3, . . . . n) each have a first primary winding, a second primary winding, and a secondary winding. The first primary winding has a first input end an' (n=1, 2, 3, . . . , n) and a second input end bn' (n=1, 2, 3, . . . . n), the second primary winding has a third input end cn' (n=1, 2, 3, . . . , n) and a fourth input end dn' (n=1, 2, 3, . . . , n), and the secondary winding has a fifth input end en' (n=1, 2, 3, . . . , n) and a sixth input end fn' (n=1, 2, 3, . . . , n). The first input ends an' (n=1, 2, 3, . . . , n) of the first primary windings of the transformers Tn' (n=1, 2, 3. . . . , n) are connected to a voltage source Vcc. The third input end c1' of the second primary winding of the transformer T1' is connected to an anode of a diode D1 of the primary driving circuit 12' (see below). The fourth input end d1' of the second primary winding of the transformer T1' is grounded. The third input ends cn' (n=2, 3, . . . , n) and the fourth input ends dn' (n=2, 3, . . . , n) of the second primary windings of the transformers Tn' (n=2, 3, . . . , n) are suspended. In the exemplary embodiment, the sixth input end f1' of the secondary winding of the transformer T1' is connected to the fifth input end e2' of the secondary winding of the transformer T2', the sixth input end f2' of the secondary winding of the transformer T2' is connected to the fifth input end e3' (not shown) of the secondary winding of the transformer T3' (not shown), and so on through to the sixth input end f(n-1)' (not shown) of the secondary winding of the transformer T(n-1)' (not shown) is connected to the fifth input end en' of the secondary winding of the transformer Tn'. In addition, the fifth input end e1' of the secondary winding of the transformer T1' and the sixth input end fn' of the secondary winding of the transformer Tn' are respectively connected to the discharge lamps 14'.

The primary driving circuit 12' comprises the diode D1, a comparator A1, a capacitor Ca, resistors Ra and Rb, a plurality of NPN-transistors $Q_{2n-1}$ (n=2, 3, 4, . . . , n), a plurality of PNP-transistors $Q_{2n}$ (n=2, 3, 4, . . . , n), and a plurality of resistors $R_n$ and $R_{n+1}$ (n=2, 3, 4, . . . , n). The diode D1, the comparator A1, the resistors Ra and Rb, and the capacitor Ca have similar connections to those of the primary driving circuit 12. In the exemplary embodiment, a circuit comprising an NPN-transistor Q3, a PNP-transistor Q4, and resistors R2 and R3 is connected to a second pulse circuit 21', and the circuit has similar connections to the corresponding components of the primary driving circuit 12. Another circuit comprising an NPN-transistor Q5 (not shown), a PNP-transistor Q6 (not shown), and resistors R4 and R5 (not shown) is connected to a third pulse circuit 31' (not shown). Similarly, a further circuit or further circuits are provided in sequence through to a final circuit. The final circuit comprises an NPN-transistor $Q_{2n-1}$, a PNP-transistor $Q_{2n}$, and resistors $R_n$ and $R_{n+1}$ connected to an $n^{th}$ pulse circuit n1'. Each of the NPN-transistors $Q_{2n-1}$ (n=2, 3, 4, . . . , n), the PNP-transistors $Q_{2n}$ (n=2, 3, 4, . . . , n), and the resistors $R_n$ (n=2, 3, 4, . . . , n) and $R_{n+1}$ (n=2, 3, 4, . . . , n) have similar connections to the corresponding components of the primary driving circuit 12. Bases of the NPN-transistors $Q_{2n-1}$ (n=2, 3, 4, . . . , n) and the PNP-transistors $Q_{2n}$ (n=2, 3, 4, . . . , n) are jointly connected to the fifth pin of the comparator A1, and ends of the resistors $R_{n+1}$ (n=2, 3, 4, . . . , n) are connected to the respective input ends of the pulse circuits n1' (n=2, 3, 4, . . . , n).

Correspondingly, the control signal generating circuit 15' generates control signals in the form of a sequence of square waves. The control signals are then transmitted to the secondary driving circuit 10', and the secondary driving circuit 10' drives the first pulse circuit 11' to generate a positive pulse sequence according to the square-wave sequence. The square-wave sequence is converted to a variable DC signal through the diode D1 of the primary driving circuit 12', and then the variable DC signal is converted to another square-wave sequence through the comparator A1. Simultaneously, the square-wave sequence outputted from the comparator A1 is outputted to the bases of the NPN-transistors $Q_{2n-1}$ (n=2, 3, 4 . . . , n) and the PNP-transistors $Q_{2n}$ (n=2, 3, 4 . . . , n), and respectively drives the second pulse circuit 21', the third pulse circuit 31', and so on through to the $n^{th}$ pulse circuit n1' to generate a positive pulse sequence.

In the exemplary embodiment, a pulse-voltage sequence for driving the discharge lamps 14 is equal to the sum of the first pulse sequence, the second pulse sequence, and so on through to the $n^{th}$ pulse sequence.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

We claim:

1. A driving device for driving discharge lamps, comprising:
   a first pulse circuit for generating a first pulse sequence, the first pulse circuit comprising an input end, a first output end, and a second output end;
   a second pulse circuit for generating a second pulse sequence, the second pulse circuit comprising an input end, a third output end, and
   a fourth output end; wherein the second output end of the first pulse circuit is connected to the third output end of the second pulse circuit, and the fourth output end of the second pulse circuit is connected to ground; and
   a primary driving circuit, connected between the first pulse circuit and the second pulse circuit for generating drive signals.

2. The driving device as claimed in claim 1, wherein the first output end of the first pulse circuit and the fourth output end of the second pulse circuit are for connection to the discharge lamps, respectively.

3. The driving device as claimed in claim 1, wherein the first pulse sequence and the second pulse sequence are positive pulse sequences.

4. The driving device as claimed in claim 1, further comprising a control signal generating circuit for generating control signals.

5. The driving device as claimed in claim 4, further comprising a secondary driving circuit for generating driving signals, the secondary driving circuit being connected between the control signal generating circuit and the first pulse circuit.

6. The driving device as claimed in claim 5, wherein the secondary driving circuit comprises:
   a voltage source;
   an NPN-transistor having a base connected to the control signal generating circuit, a drain connected to the voltage source, and an emitter;
   a PNP-transistor having a base connected to the control signal generating circuit, a drain being grounded, and an emitter connected to the emitter of the NPN-transistor; and
   a resistor having a first end connected to the emitter of the PNP-transistor, and a second end connected to the input end of the first pulse circuit, the second end being an output end of the secondary driving circuit.

7. The driving device as claimed in claim 1, wherein the primary driving circuit comprises:
   a diode comprising a cathode; and
   a comparator comprising a first pin, a second pin, a third pin, a fourth pin, and a fifth pin;
   wherein the first pin is connected to the cathode of the diode, the second pin is connected to a reference voltage, the third pin is connected to a voltage source, the fourth pin is grounded, and the fifth pin is connected to the input end of the second pulse circuit.

8. The driving device as claimed in claim 1, wherein the first pulse circuit and the second pulse circuit respectively comprise:
   a switch element, comprising an input end, a fifth output end, and a sixth output end; wherein the input end corresponds to the input end of the first pulse circuit or the second pulse circuit, and the fifth output end is grounded; and
   a transformer comprising a first primary winding comprising a first input end and a second input end, a second primary winding comprising a third input end and a fourth input end, and a secondary winding comprising a fifth input end and a sixth input end;
   wherein the second input end of the first primary winding is connected to the sixth output end of the switch element, and the first input end of the first primary winding is connected to a voltage source.

9. The driving device as claimed in claim 8, wherein the fourth input end of the second primary winding of the transformer of the first pulse circuit is grounded.

10. The driving device as claimed in claim 8, wherein the third input end and the fourth input end of the second primary winding of the transformer of the second pulse circuit are suspended.

11. The driving device as claimed in claim 8, wherein the fifth input end of the secondary winding of the transformer of the first pulse circuit and the sixth input end of the secondary winding of the transformer of the second pulse circuit are for connection to the discharge lamps.

12. The driving device as claimed in claim 8, wherein the sixth input end of the secondary winding of the transformer of the first pulse circuit is connected to the fifth input end of the transformer of the secondary winding of the second pulse circuit.

13. The driving device as claimed in claim 8, wherein the sixth input end of the secondary winding of the transformer of the second pulse circuit is grounded.

14. A driving device for driving discharge lamps of a display device, comprising:
   a plurality of pulse circuits for generating pulse sequences, each pulse circuit comprising an input end, a first output end, and a second output end, wherein the number of pulse circuits is defined as n, where n is an integer from 1 to (k+1), and k is an integer; and
   a primary driving circuit, having an input end connected to a first one of the pulse circuits for generating drive signals;
   wherein the second output end of the $k^{th}$ pulse circuit is connected to the first output end of the $(k+1)^{th}$ pulse circuit, and the second output end of the $(k+1)^{th}$ pulse circuit is connected to ground.

15. The driving device as claimed in claim 14, wherein the first output end of the $k^{th}$ pulse circuit and the second output end of the $(k+1)^{th}$ pulse circuit are for connection to the discharge lamps.

16. The driving device as claimed in claim 14, wherein the pulse sequences are positive pulse sequences.

17. The driving device as claimed in claim 14, further comprising a control signal generating circuit for generating control signals.

18. The driving device as claimed in claim 17, further comprising a secondary driving circuit for generating driving signals, the secondary driving circuit being connected between the control signal generating circuit and the first pulse circuit.

19. A method to drive illuminators of a display device, comprising the steps of:
- electrically connecting at least two pulse circuits in series, and directly electrically connecting said at least two pulse circuits in parallel to an illuminator of a display device;
- electrically connecting a first driving circuit with said at least two pulse circuits respectively;
- electrically connecting a second driving circuit with one pulse circuit of said at least two pulse circuits;
- activating said one pulse circuit electrically connected to said second driving circuit for driving said illuminator by means of said second driving circuit; and
- activating the remaining pulse circuits of said at least two pulse circuits for jointly driving said illuminator by means of said first driving circuit;
- wherein said illuminator is driven by a driving pulse sequence from said one pulse circuit and driving pulse sequences from said remaining pulse circuits.

20. The method as claimed in claim 19, wherein said driving pulse sequence from said one pulse circuit to said illuminator and said driving pulse sequences from said remaining pulse circuits to said illuminator are in phase.

* * * * *